(12) United States Patent
Lim et al.

(10) Patent No.: US 9,048,594 B2
(45) Date of Patent: Jun. 2, 2015

(54) DUAL SIM CARD CONNECTOR

(71) Applicant: Molex Incorporated, Lisle, IL (US)

(72) Inventors: Kian Heng Lim, Singapore (SG); Shang-Xiu Zeng, Chengdu (CN); Hong Liang Wang, Chengdu (CN)

(73) Assignee: Molex Incorporated, Lisle, IL (US)

( * ) Notice: Subject to any disclaimer, the term of this patent is extended or adjusted under 35 U.S.C. 154(b) by 130 days.

(21) Appl. No.: 13/845,342

(22) Filed: Mar. 18, 2013

(65) Prior Publication Data

US 2014/0113495 A1 Apr. 24, 2014

(30) Foreign Application Priority Data

Mar. 16, 2012 (CN) .......................... 2012 1 0079256

(51) Int. Cl.
*H01R 24/00* (2011.01)
*H01R 12/71* (2011.01)
*H01R 27/00* (2006.01)

(52) U.S. Cl.
CPC ................ *H01R 12/71* (2013.01); *H01R 27/00* (2013.01)

(58) Field of Classification Search
CPC ............ H01R 23/682; H01R 23/7005; H01R 23/7068; H01R 23/7026; G06K 7/0021; G06K 13/08
USPC .................................. 439/630, 326, 328, 331
See application file for complete search history.

(56) References Cited

U.S. PATENT DOCUMENTS

| | | | | |
|---|---|---|---|---|
| 4,891,013 A * | 1/1990 | Komaki | | 439/66 |
| 5,603,629 A * | 2/1997 | DeFrasne et al. | | 439/331 |
| 5,655,917 A * | 8/1997 | Kaneshige et al. | | 439/155 |
| 5,877,488 A * | 3/1999 | Klatt et al. | | 235/486 |
| 5,933,328 A * | 8/1999 | Wallace et al. | | 361/737 |
| 6,062,887 A * | 5/2000 | Schuster et al. | | 439/218 |
| 6,193,557 B1 * | 2/2001 | Luvini et al. | | 439/630 |
| 6,261,113 B1 * | 7/2001 | Chen | | 439/260 |
| 6,568,960 B2 | 5/2003 | Bricaud et al. | | |
| 6,602,096 B1 * | 8/2003 | Kronestedt et al. | | 439/630 |
| 6,724,618 B1 * | 4/2004 | Jenkins et al. | | 361/679.32 |
| 6,766,952 B2 * | 7/2004 | Luu | | 235/451 |
| 6,808,424 B2 * | 10/2004 | Kaneshiro et al. | | 439/638 |
| 6,974,343 B2 * | 12/2005 | Zheng et al. | | 439/326 |
| 7,066,386 B2 * | 6/2006 | Izumi | | 235/381 |
| 7,125,258 B2 * | 10/2006 | Nakakubo et al. | | 439/64 |
| 7,346,371 B2 * | 3/2008 | Tomatsu | | 455/558 |
| 7,442,086 B1 * | 10/2008 | Chang | | 439/630 |

(Continued)

FOREIGN PATENT DOCUMENTS

| | | |
|---|---|---|
| TW | 477499 | 2/2000 |
| TW | M401896 | 4/2011 |

*Primary Examiner* — Abdullah Riyami
*Assistant Examiner* — Vladimir Imas
(74) *Attorney, Agent, or Firm* — Stephen L. Sheldon

(57) ABSTRACT

A dual SIM card tray and an electrical connector device are disclosed. The electrical connector device comprises a tray and a connector module. The dual SIM card tray has a first receiving groove and a second receiving groove, which are positioned at two opposing sides, for respectively loading a mini-SIM card and a micro-SIM card, and has a first window communicated with the first receiving groove and a second window communicated with the second receiving groove. The first window and the second window are arranged in a lengthwise direction of the tray, so that conductive pads of the two SIM cards are exposed toward the same side. The connector module includes first and second connectors and an outer shell.

14 Claims, 17 Drawing Sheets

(56) References Cited

U.S. PATENT DOCUMENTS

| | | | |
|---|---|---|---|
| 7,634,297 B2* | 12/2009 | Sin | 455/558 |
| 7,672,691 B2* | 3/2010 | Kim et al. | 455/558 |
| 7,789,691 B2* | 9/2010 | Li et al. | 439/325 |
| 7,798,858 B1* | 9/2010 | Zuo | 439/630 |
| 7,896,670 B1 | 3/2011 | Gao et al. | |
| 7,938,656 B2* | 5/2011 | Hu | 439/159 |
| 7,967,632 B2* | 6/2011 | Kiryu et al. | 439/541.5 |
| 8,215,558 B2* | 7/2012 | Valenzuela et al. | 235/486 |
| 8,233,949 B2* | 7/2012 | Li et al. | 455/575.4 |
| 8,308,514 B1* | 11/2012 | Su et al. | 439/630 |
| 8,376,764 B1* | 2/2013 | Su et al. | 439/157 |
| 8,579,640 B2* | 11/2013 | Ho | 439/159 |
| 8,740,635 B2* | 6/2014 | Lim et al. | 439/159 |
| 8,747,161 B2* | 6/2014 | Yu et al. | 439/630 |
| 8,801,468 B2* | 8/2014 | Gao | 439/630 |
| 2003/0153356 A1* | 8/2003 | Liu | 455/558 |
| 2010/0165589 A1 | 7/2010 | Zhou | |

* cited by examiner

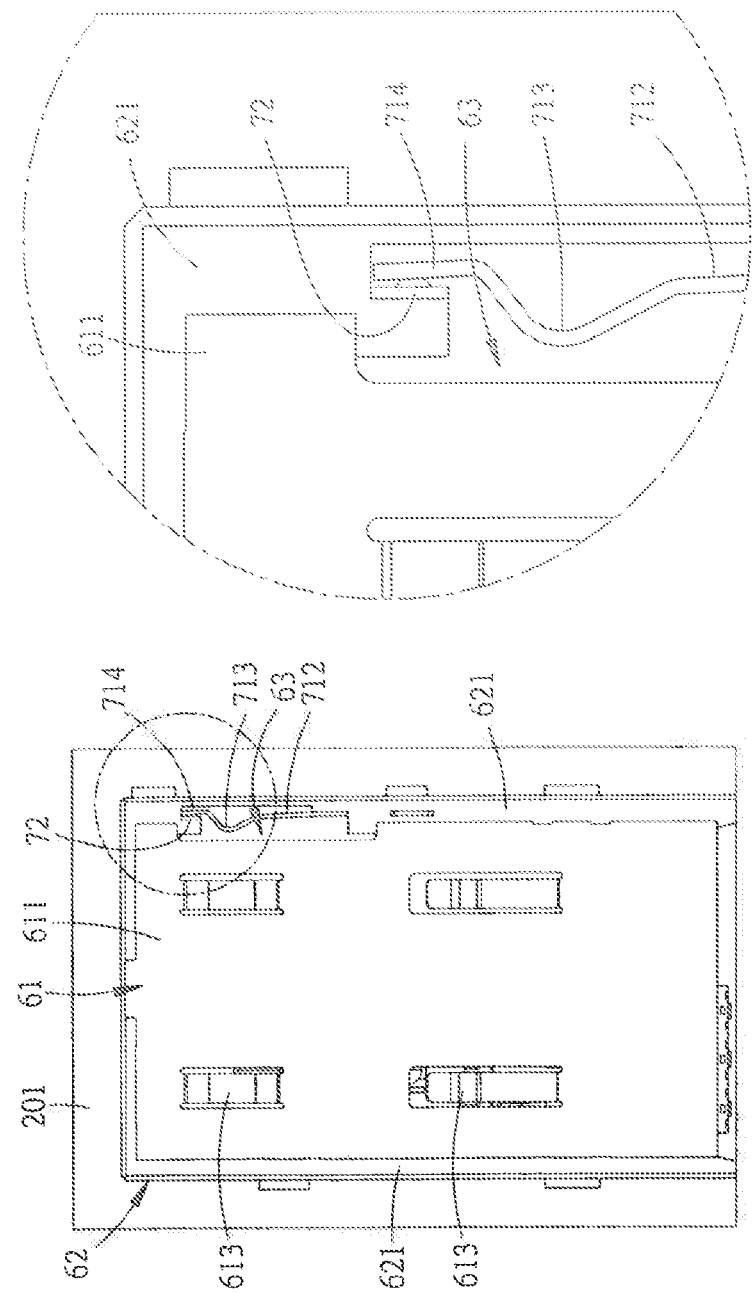

DUAL SIM CARD CONNECTOR

RELATED APPLICATIONS

This application claims priority to Chinese Application No. 201210079256.7, filed Mar. 16, 2012, which is incorporated herein by reference in its entirety.

FIELD OF THE PRESENT INVENTION

The present application relates to an electrical connector, and more specifically, to an electrical connector suitable for use in loading SIM (Subscriber Identity Module) cards by a tray.

BACKGROUND OF THE PRESENT INVENTION

A conventional dual SIM card connector is configured to provide two connectors side-by-side in a left-right direction or stacked in an up-down direction so that each connector can receive one SIM card. As can be appreciated, such a configuration occupies a substantial amount of volume. Other connectors that load a SIM card by a tray can only load one SIM card and generally cannot load two SIM cards at the same time.

For example, a connector loading a MMC card and a Micro-SIM card by a tray is disclosed by U.S. Pat. No. 6,568,960 (corresponding to Taiwan Patent publication No. 470919; corresponding to China Patent Application No. 99810966.5), however, conductive pads of the MMC card is only a single row and conductive pads of the SIM card are arranged in two rows, there is significant difference in the configuration of both, therefore such a connector cannot load two SIM cards.

SUMMARY OF THE PRESENT INVENTION

According to an embodiment of the present application, an electrical connector device of the present application comprises a tray and a connector module.

The tray comprises a main body which has a top side, a bottom side, a first receiving groove, a second receiving groove, a first window and a second window. The bottom side is positioned at an opposing side of the top side. The first receiving groove is formed to the top side of the main body for loading a mini-SIM card. The second receiving groove is formed to the bottom side of the main body and partially positioned below the first receiving groove for loading a micro-SIM card. The first window extends from a part of the first receiving groove in a direction from the top side to the bottom side and penetrates through the bottom side, so as to expose conductive pads of the mini-SIM card toward the bottom side. The second window is an opening of the second receiving groove on the bottom side, and the second window and the first window are arranged in a lengthwise direction of the tray, so as to expose conductive pads of the micro-SIM card toward the bottom side.

The connector module comprises a circuit board, a first connector, a second connector and an outer shell. The first connector is provided to the circuit board, and comprises a first insulative body and a plurality of first terminals provided to the first insulative body; each first terminal has a first contact portion. The second connector is provided to the circuit board and separated from the first connector, and comprises a second insulative body and a plurality of second terminals provided to the second insulative body; each second terminal has a second contact portion. The outer shell is provided to the circuit board and covers the first connector and the second connector, and defines an insertion space receiving the tray and an entrance for the tray entering into or coming out from the insertion space. The first connector is away from the entrance relative to the second connector, and a height of the first contact portions of the first terminals on the circuit board is higher than a height of the second contact portions of the second terminals. The first contact portions of the first terminals corresponds to the first window, so as to contact the conductive pads of the mini-SIM card; and the second contact portions of the second terminals corresponds to the second window, so as to contact the conductive pads of the micro-SIM card.

The outer shell may be a metal cover which is connected with the first insulative body and is soldered to the circuit board; or the outer shell may comprise a metal cover and an insulative frame body which are connected with each other, and the metal cover is soldered to the circuit board.

The connector module further may comprise a detect switch which comprises a detect terminal and a detect piece. The detect terminal has a resilient arm, a pushed portion formed to the resilient arm, a contact portion formed to the resilient arm, and a connecting portion. The detect piece is formed to the metal cover and corresponds to the contact portion of the detect terminal. The metal cover and the connecting portion of the detect terminal are electrically connected with a detect circuit of the circuit board. The pushed portion of the detect terminal extends into the insertion space without external force and is withdrawn from the insertion space when being pushed; the contact portion is moved together with the pushed portion, and a state of electrical connection between the contact portion and the detect piece is changed when the pushed portion is withdrawn from the insertion space, thereby controlling signal transmission of the first terminals and the second terminals.

BRIEF DESCRIPTION OF THE DRAWINGS

FIG. 11 is a top view of FIG. 5 illustrating a state that a pushed portion of a detect terminal is positioned in an insertion space;

FIG. 12 is a partially enlarged view of FIG. 11;

DESCRIPTION OF THE PREFERRED EMBODIMENTS

Figure 1:
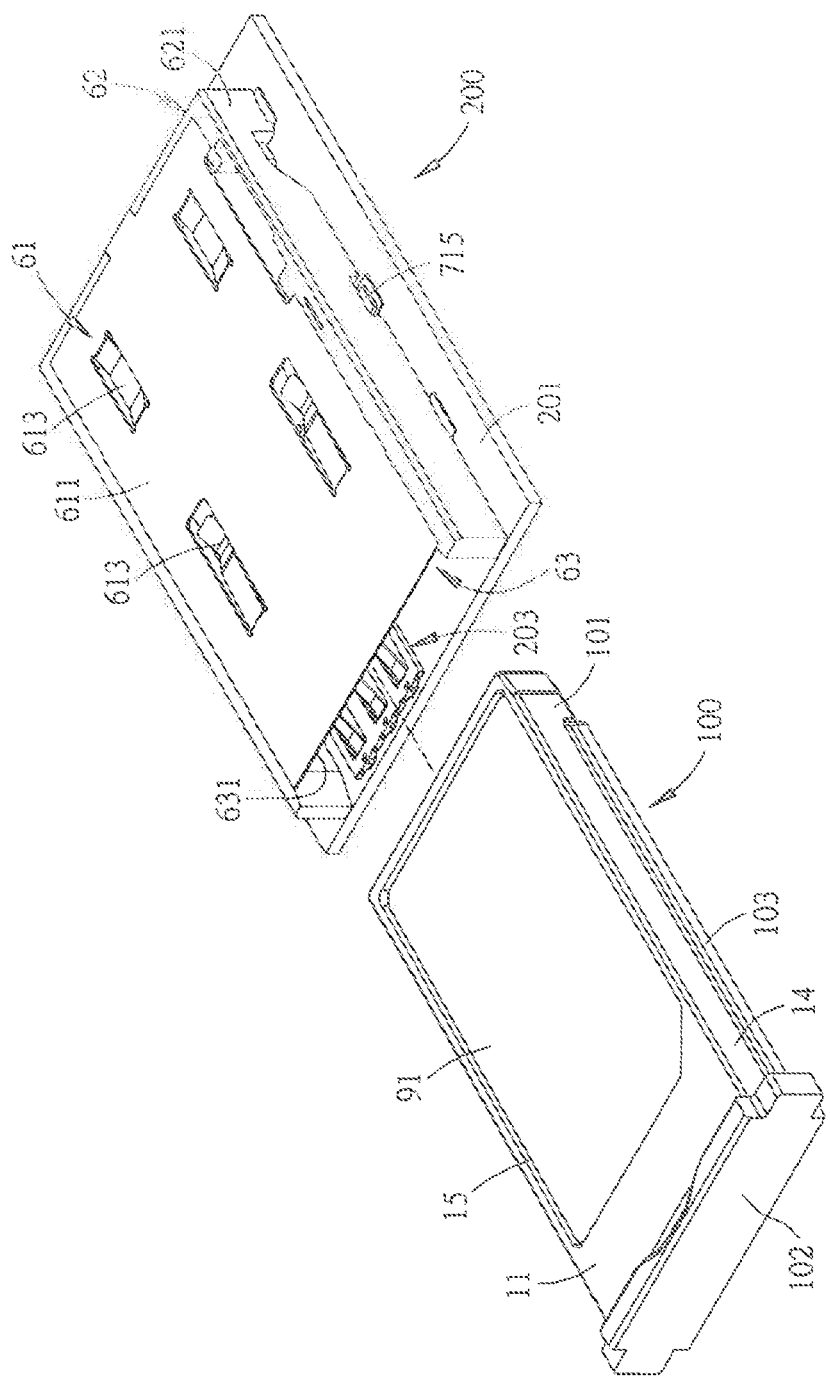
FIG. 1 is a perspective view illustrating a first preferred embodiment of an electrical connector device of the present application.

The foregoing and other technical contents, features and effects relating to the present application will be clearly shown through the following detailed description for embodiments in combination with reference to the accompanying drawings. Before the present application is described in details, it should be noted that similar elements are identified by same reference numerals in the following description.

The beneficial technical effects of the present application are as follows: the tray has the first receiving groove and the second receiving groove to respectively receive the mini-SIM card and the micro-SIM card, so the tray may load two SIM cards with different sizes at the same time. Furthermore, the connector module may receive the tray and comprises the first connector and the second connector which are separately provided on the circuit board, so as to lower the volume of space after assembly and be capable of more easily controlling coplanarity of surface soldering and reducing manufacturing difficulty.

Therefore, an embodiment can provide a tray capable of loading two SIM cards. Such an embodiment can provide a connector module capable of providing electrical connection to two SIM cards. In an embodiment there can be an electrical connector device, which comprises a tray and a connector module, capable of providing electrical connection to two SIM cards.

Figure 2:
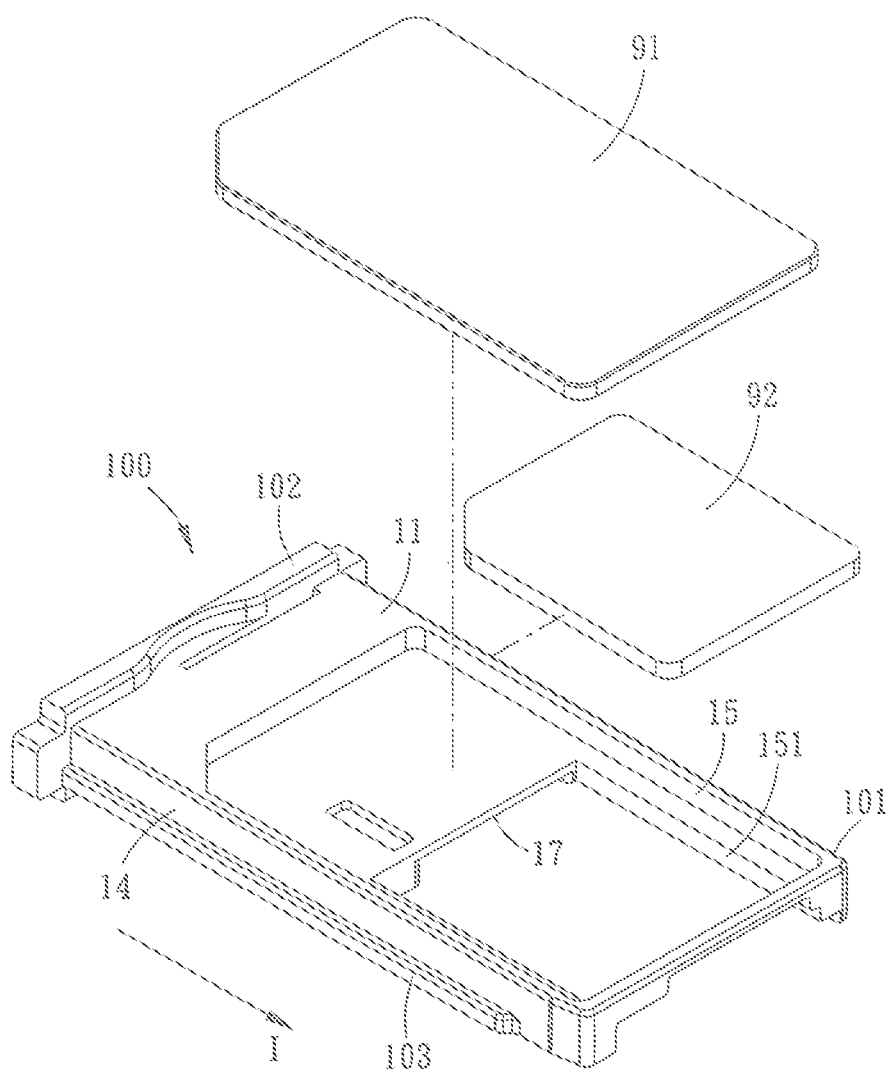
FIG. 2 is a perspective view illustrating an engagement relationship among a tray, a mini-SIM card and a micro-SIM card in the first preferred embodiment.

Referring to FIG. 1 and FIG. 2, a first embodiment of an electrical connector device that is applicable to load a mini-SIM card 91 and a micro-SIM card 92 and the embodiment comprises a tray 100 and a connector module 200.

Figure 3:
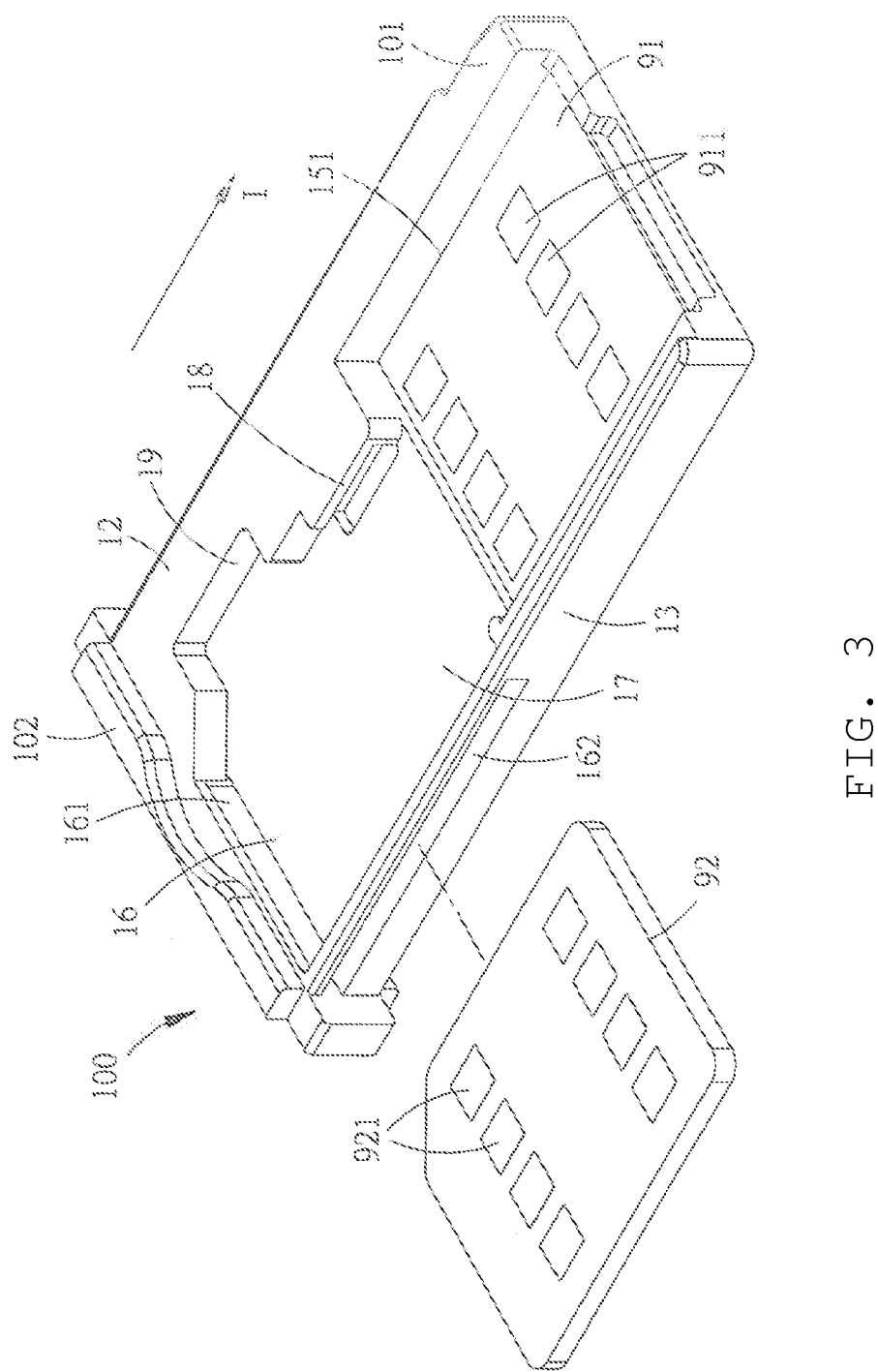
FIG. 3 is a perspective view illustrating the tray from the other side.
Figure 4:
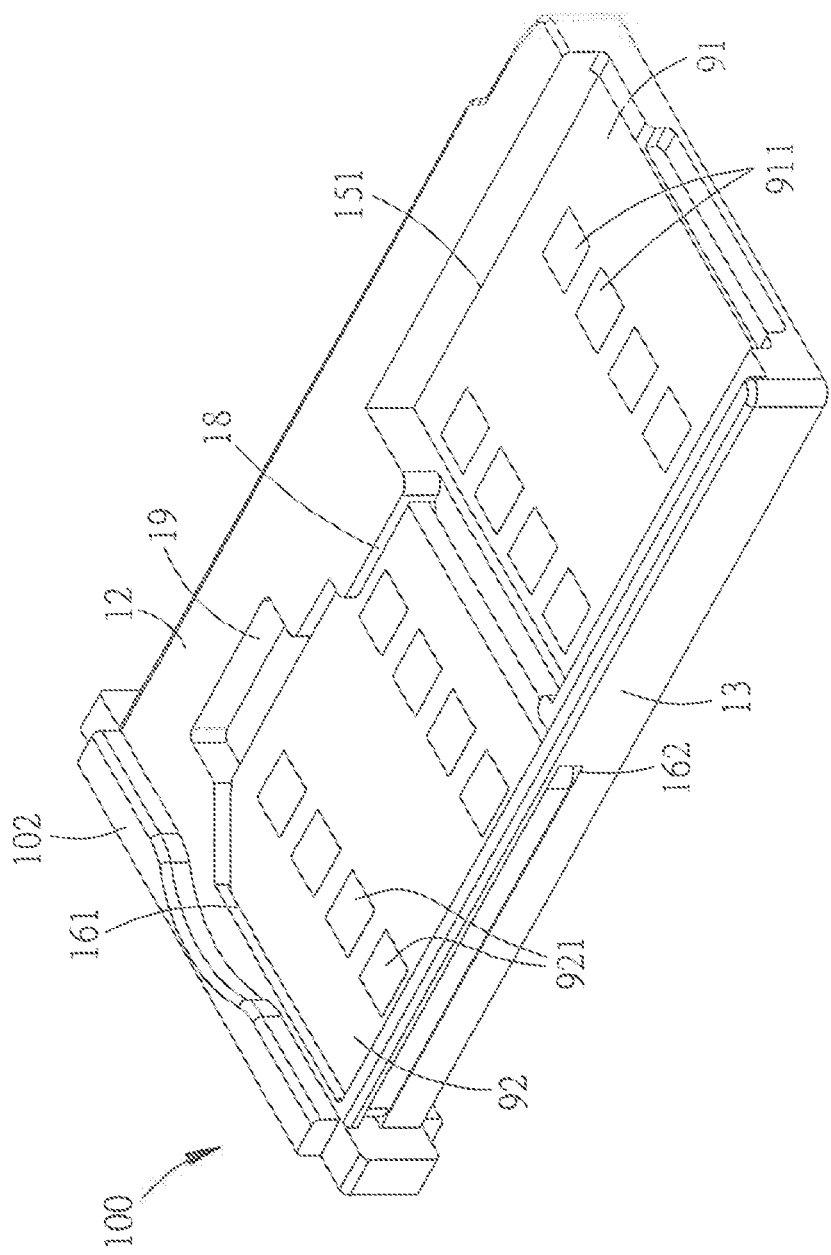
FIG. 4 is a perspective view illustrating an engagement relationship among the tray and the SIM cards.
Figure 5:
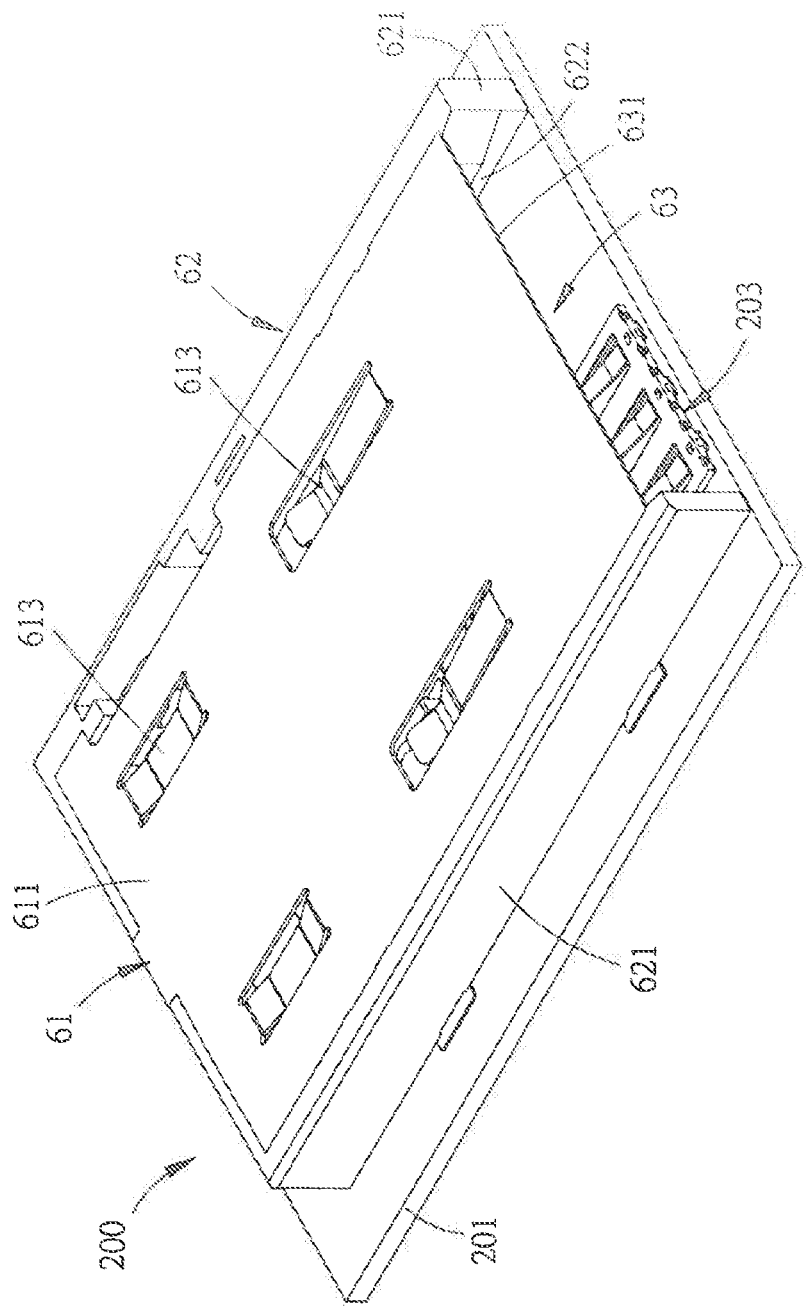
FIG. 5 is a perspective view illustrating a connector module in the first preferred embodiment.

Referring to FIG. 2, FIG. 3 and FIG. 4, the tray 100 comprises a main body 101, a hand-gripping portion 102 and a polarizing portion 103. The main body 101 has a top side 11, a bottom side 12, a first side surface 13, a second side surface 14, a first receiving groove 15, a second receiving groove 16, a first window 151, a second window 161 and a spacer 17. The bottom side 12 is positioned at an opposing side of the top side 11; the first side surface 13 and the second side surface 14 are respectively connected to the top side 11 at two opposing sides and the bottom side 12 at two opposing sides and are parallel to a lengthwise direction I of the tray 100. The first receiving groove 15 for loading the mini-SIM card 91 is formed to the top side 11 of the main body 101; and the first window 151 extends from a part of the first receiving groove 15 in a direction from the top side 11 to the bottom side 12 and penetrates through the bottom side 12, so that conductive pads 911 of the mini-SIM card 91 are exposed toward the bottom side 12. The second receiving groove 16 for loading the micro-SIM card 92 is formed to the bottom side 12 of the main body 101 and is partially positioned below the first receiving groove 15; the second window 161 is an opening of the second receiving groove 16 at the bottom side 12; and the second window 161 and the first window 151 are arranged in the lengthwise direction I of the tray 100, so that conductive pads 921 of the micro-SIM card 92 are exposed toward the bottom side 12. The spacer 17 is positioned between the first receiving groove 15 and the second receiving groove 16, so as to separate the first receiving groove 15 from the second receiving groove 16.

More specifically, the first receiving groove 15 is formed by recessing from the top side 11 toward the bottom side 12, and an entrance of the first receiving groove 15 is positioned at the top side 11 so to place the mini-SIM card 91 into the first receiving groove 15. That is to say, the mini-SIM card 91 may be directly placed into the first receiving groove 15 from the top side 11, the tray 100 is turned over to make the top side 11 face downwardly so that the mini-SIM card 91 may be withdrawn from the first receiving groove 15, it is easy for an operator to take the mini-SIM card 91 out from the first receiving groove 15 and put the mini-SIM card 91 into the first receiving groove 15. The first window 151 is positioned in a region where the first receiving groove 15 and the second receiving groove 16 are not overlapped in space; and because the first receiving groove 15 is positioned above the second receiving groove 16, the mini-SIM card 91 (in the first receiving groove 15) is positioned above the micro-SIM card 92 (in the second receiving groove 16). Therefore, the conductive pads 911 of the mini-SIM card 91 exposed to the first window 151 are higher than the conductive pads 921 of the micro-SIM card 92 exposed to the second window 161 in horizontal position.

Furthermore, the main body 101 further has an insert opening 162, a supporting plate 18 and a recess portion 19. The insert opening 162 is formed in the first side surface 13 by the second receiving groove 16 penetrating through the first side surface 13 and is an entrance of the second receiving groove 16 for placing the micro-SIM card 92 into the second receiving groove 16. The supporting plate 18 is a part constituting the second receiving groove 16 (namely, defining a partial region of the second receiving groove 16), is positioned at an opposing side of the insert opening 162 and is opposite to and spaced apart from a plane where the spacer 17 is present. An edge of the supporting plate 18 defines a part of the second window 161, and is used to limit displacement of the micro-SIM card 92 toward the bottom side 12. That is to say, when the micro-SIM card 92 is placed into the second receiving groove 16 via the insert opening 162, one side of the micro-SIM card 92 parallel to the lengthwise direction I of the tray 100 is positioned at the insert opening 162 and is limited by a wall portion defining the insert opening 162, and the other side of the micro-SIM card 92 parallel to the lengthwise direction I of the tray 100 is limited by the supporting plate 18, so that the micro-SIM card 92 cannot fall down under a general operative state of the tray 100 (the bottom side 12 faces downwardly). The recess portion 19 is positioned at an opposing side of the insert opening 162 and extends from the second receiving groove 16 in a direction away from the insert opening 162 and is exposed to the bottom side 12, is used for a finger to insert and push the micro-SIM card 92 so that the micro-SIM card 92 is withdrawn from the second receiving groove 16.

Referring to FIG. 1 again, the hand-gripping portion 102 is connected to the main body 101 at a side having a short length, is used to grip by a hand of an operator, so as to engage the main body 101 with the connector module 200 or separate the main body 101 from the connector module 200. The polarizing portion 103 is a rib protrudedly extending from the second side surface 14 of the main body 101, is used to prevent an operator from mistakenly mating the tray 100 with the connector module 200. Specific operative relationship will be described in details later.

Referring to FIGS. 5-8, the connector module 200 comprises a circuit board 201, a first connector 202, a second connector 203, outer shells 61, 62, and detect switches 71, 72.

The first connector 202 is provided to the circuit board 201 and comprises a first insulative body 2 and a plurality of first terminals 3 provided to the first insulative body 2. The first insulative body 2 has a plurality of first terminal grooves 21 respectively receiving the first terminals 3, the first terminal grooves 21 are arranged in two rows. Each first terminal 3 has a first retention portion 31, a first resilient arm 32, a first contact portion 33 and a first tail portion 34. The first retention portion 31 is fixed to the first insulative body 2; the first resilient arm 32 is folded and extends from the first retention portion 31; the first contact portion 33 is connected to a distal end of the first resilient arm 32; the first tail portion 34 is connected to the first retention portion 31 and is soldered to the circuit board 201, the first tail portion 34 and the first resilient arm 32 are respectively positioned at two opposite ends of the first retention portion 31.

The second connector 203 is provided to the circuit board 201 and comprises a second insulative body 4 and a plurality of second terminals 5 provided to the second insulative body 4. The second terminals 5 and the second insulative body 4 are integrally formed by insert molding, the second terminals 5 and the second insulative body 4 are separately shown in FIG. 7, which is an exploded perspective view of the second connector 203. The second insulative body 4 has a plurality of second terminal grooves 41 respectively corresponding to the second terminals 5, the second terminal grooves 41 are arranged in two rows. Each second terminal 5 has a second retention portion 51, a second resilient arm 52, a second contact portion 53, and a second tail portion 54. The second retention portion 51 is embedded and fixed in the second insulative body 4; the second resilient arm 52 extends out of the second terminal groove 41 from the second retention portion 51; the second contact portion 53 is connected to a distal end of the second resilient arm 52; the second tail portion 54 is connected to the second retention portion 51 and is soldered to the circuit board 201. The first connector 202 and the second connector 203 are separately provided on the circuit board 201, so as to lower the volume of space after assembly and be capable of more easily controlling coplanarity of surface soldering and reducing manufacturing difficulty.

Figure 6:
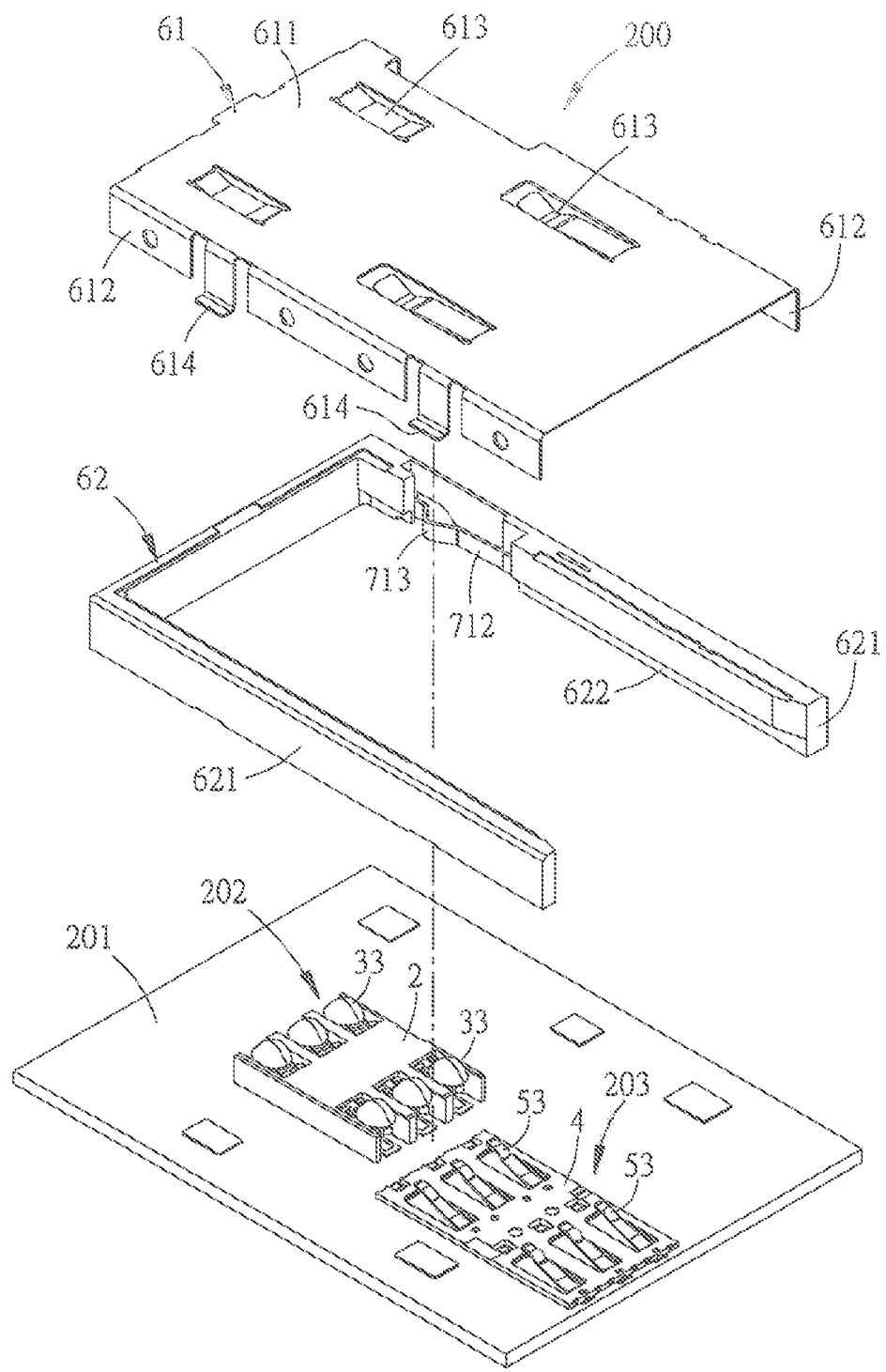
FIG. 6 is an exploded perspective view of FIG. 5.
Figure 7:
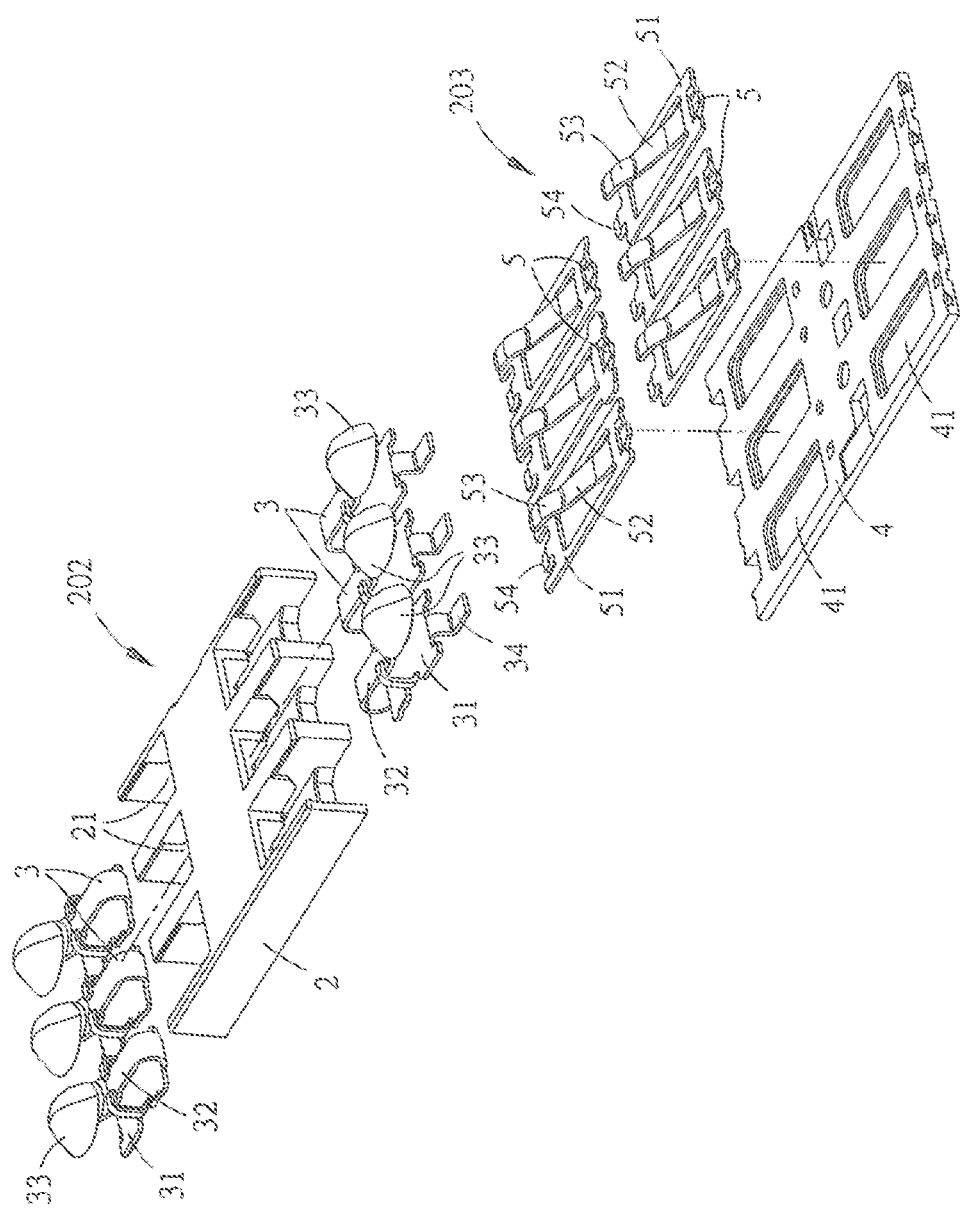
FIG. 7 is an exploded perspective view illustrating a first connector and a second connector of the connector module.
Figure 8:
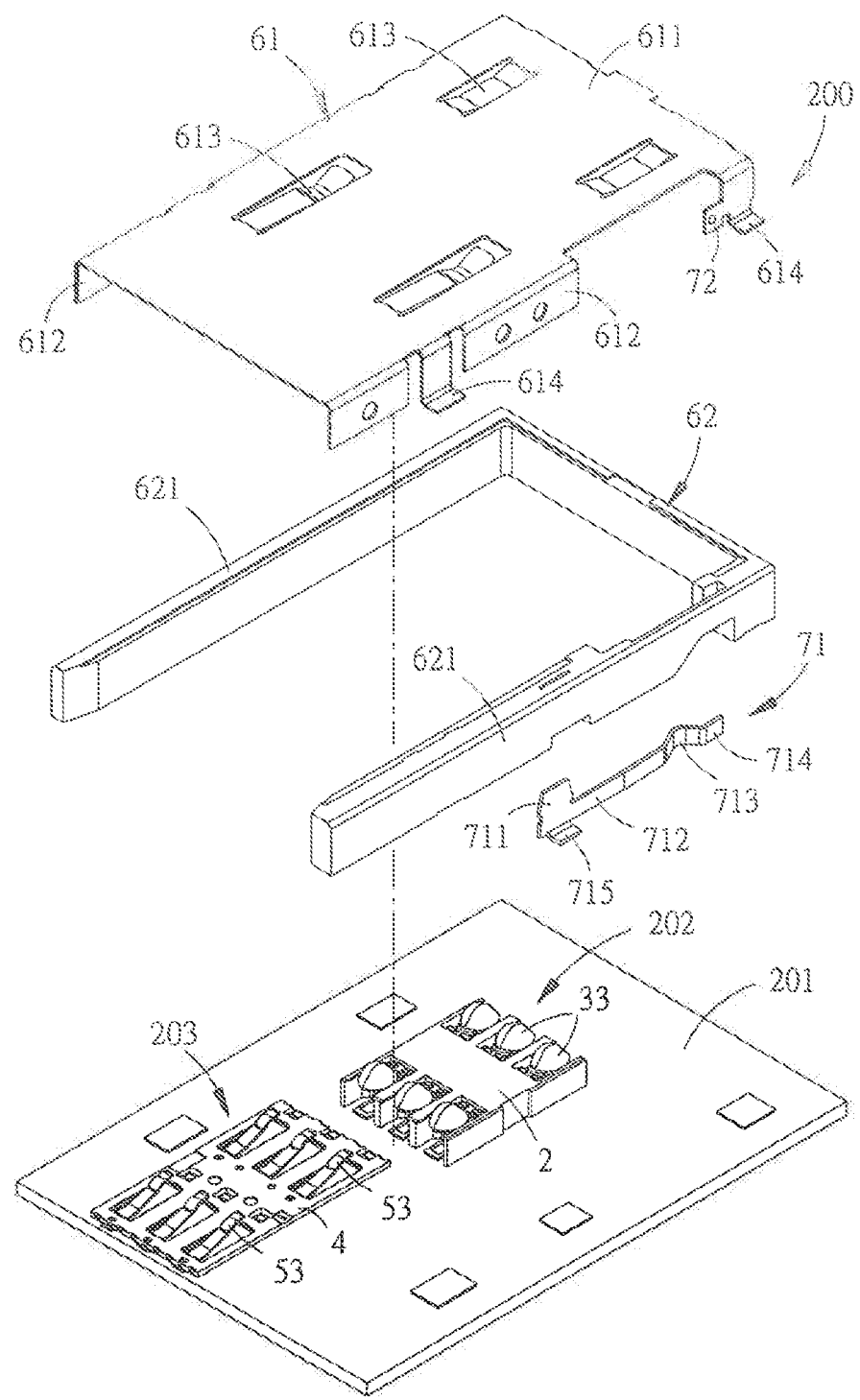
FIG. 8 is a view of FIG. 6 viewed from another angle.

Referring to FIG. 1, FIG. 6 and FIG. 8, the outer shell comprises a metal cover 61 and an insulative frame body 62 which are connected each other, is provided to the circuit board 201 covers the first connector 202 and the second connector 203, and defines an insertion space 63 receiving the tray 100 and an entrance 631 for the tray 100 accessing the insertion space 63. The metal cover 61 has a top plate 611 and two side plates 612 connected to two opposing sides of the top plate 611, and two pairs of resilient abutting portions 613 formed to the top plate 611, and a plurality of soldering legs 614 respectively formed to the two side plates 612. The resilient abutting portions 613 are used to abut against the mini-SIM card 91 when the main body 101 of the tray 100 is placed into the insertion space 63; the soldering legs 614 are used to be soldered on the circuit board 201. The insulative frame body 62 is a U-shaped, and has opposing arm portions 621 and a guide rail 622 formed in one of the arm portions 621.

The two side plates 612 of the metal cover 61 are respectively embedded in the two arm portions 621 of the insulative frame body 62, that is to say, the metal cover 61 and the insulative frame body 62 are integrally formed by insert molding. The metal cover 61 and the insulative frame body 62 are separately shown in FIG. 6 and FIG. 8. However, in a comparable embodiment, the metal cover 61 and the insulative frame body 62 may be combined by insertion or latching. The guide rail 622 of the insulative frame body 62 is mated with the polarizing portion 103 of the tray 100, which is used to receive the polarizing portion 103 and slide the polarizing portion 103 along the guide rail 622.

Figure 9:
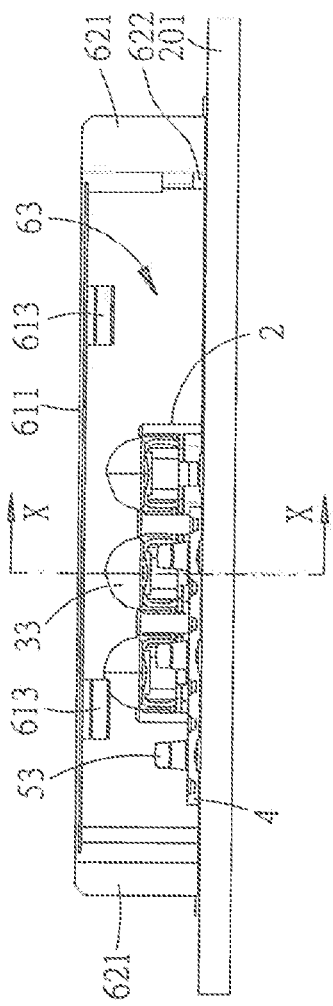
FIG. 9 is a front view of FIG. 5.
Figure 10:
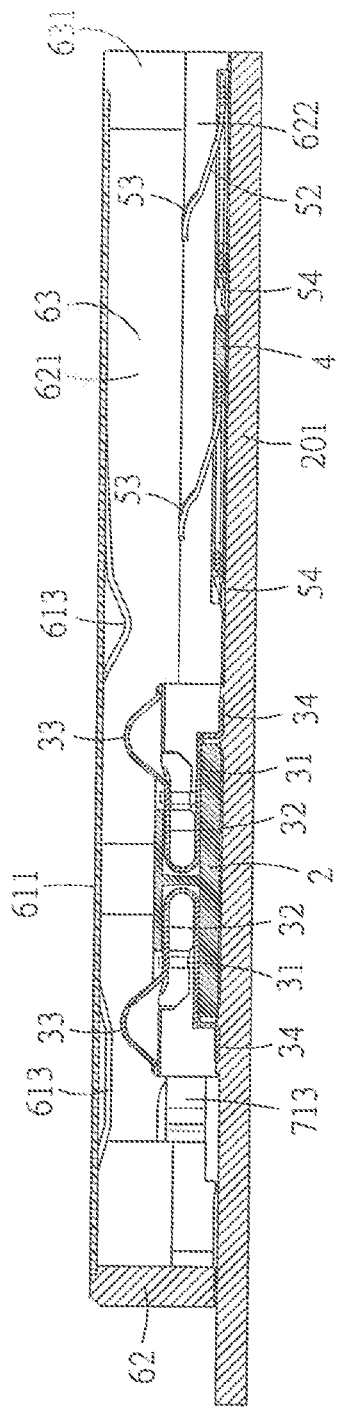
FIG. 10 is a sectional view taken along an X-X line of FIG. 9.

Referring to FIG. 9 and FIG. 10, the first connector 202 and the second connector 203 are positioned in the insertion space 63; and the first connector 202 is away from the entrance 631 relative to the second connector 203, and has a height higher than a height of the second contact portions 53 of the second terminals 5 on the circuit board 201. Moreover, in combination with reference to FIG. 4, the first window 151 of the tray 100 is away from the hand-gripping portion 102 relative to the second window 161; and the conductive pads 911 of the mini-SIM card 91 exposed to the first window 151 in horizontal position is higher than the conductive pads 921 of the micro-SIM card 92 exposed to the second window 161 when the bottom side 12 of the main body 101 faces downwardly (that is, the first window 151 and the second window 161 face downwardly). When the main body 101 of the tray 100 is placed into the insertion space 63, the first contact portions 33 of all the first terminals 3 correspond to the first window 151 so as to respectively contact the conductive pads 911 of the mini-SIM card 91, and the second contact portions 53 of all the second terminals 5 correspond to the second window 161 so as to respectively contact the conductive pads 921 of the micro-SIM card 92.

Figure 14:
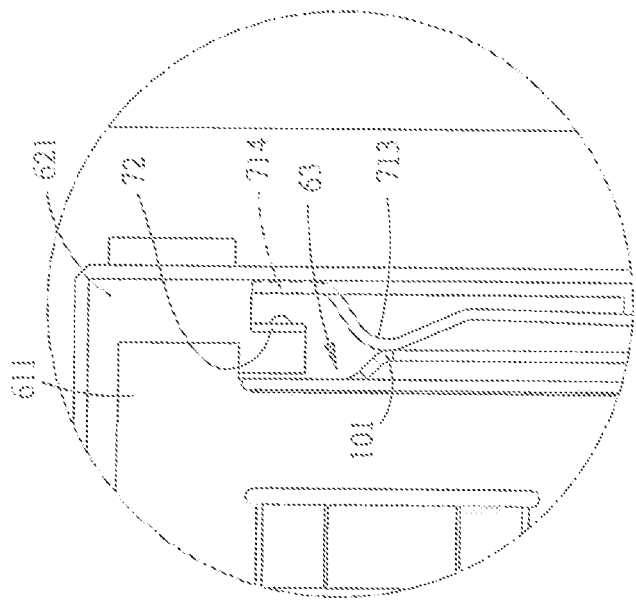
FIG. 14 is a partially enlarged view of FIG. 13.
Figure 13:
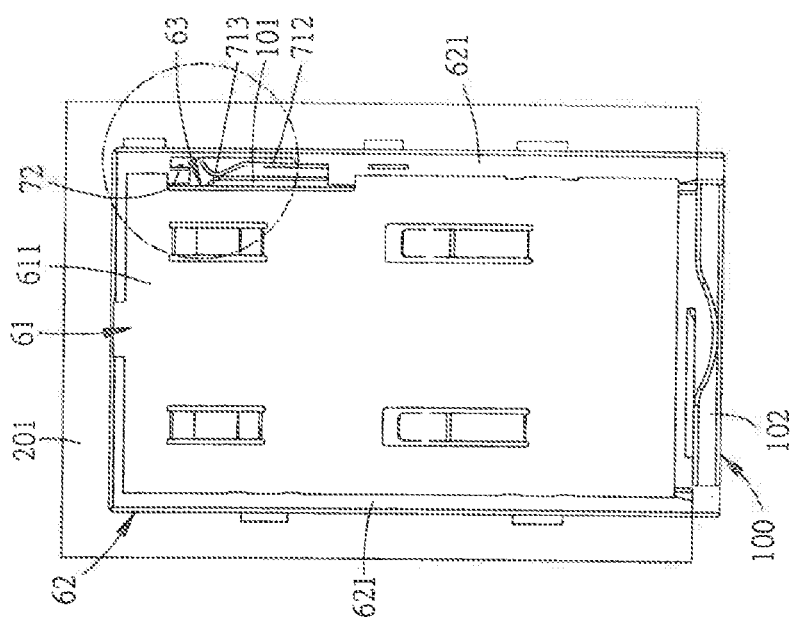
FIG. 13 is a top view of FIG. 11 illustrating a state that a pushed portion of a detect terminal is withdrawn from an insertion space for illustrating an interacting relationship between the tray and a detect switch in the first preferred embodiment.

Referring to FIG. 8, FIG. 11 and FIG. 12, the detect switch comprises a detect terminal 71 and a detect piece 72, the detect terminal 71 is fixed to the insulative frame body 62 (see FIG. 6), the detect piece 72 is formed to the metal cover 61. The detect terminal 71 has a retention portion 711, a resilient arm 712, a pushed portion 713, a contact portion 714, and a connecting portion 715. The retention portion 711 is fixed on one of the arm portions 621 of the insulative frame body 62. The resilient arm 712 extends from the retention portion 711. The pushed portion 713 is formed to the resilient arm 712 and extends into the insertion space 63 without external force. The contact portion 714 is formed at a distal end of the resilient arm 712 and corresponds to the detect piece 72; when the pushed portion 713 is not subject to external force, the contact portion 714 abuts against the detect piece 72, and the contact portion 714 and the detect piece 72 are in contact with each other to form electrical connection. The connecting portion 715 extends downwardly from the retention portion 711 and is soldered to the circuit board 201, both the metal cover 61 and the detect terminal 71 are electrically connected with a detect circuit (not shown in figures) of the circuit board 201. Referring to FIG. 13 and FIG. 14, when the main body 101 of the tray 100 is placed into the insertion space 63, the pushed portion 713 of the detect terminal 71 is pushed by the main body 101 of the tray 100 to be withdrawn from the insertion space 63; and the contact portion 714 is moved together with the pushed portion 713, so that the contact portion 714 is separated from the detect piece 72 to form an disconnected circuit when the pushed portion 713 is withdrawn out from the insertion space 63, that is, the state of electrical connection between the contact portion 714 and the detect piece 72 is changed.

Therefore, it can be known that the mini-SIM card 91 and the micro-SIM card 92 loaded on the tray 100 have been in position, that is, the conductive pads 911 of the mini-SIM card 91 have been in contact with the first contact portions 33 of the first terminals 3 and the conductive pads 921 of the micro-SIM card 92 have been in contact with the second contact portions 53 of the second terminals 5, so that signal transmission may be started. When the main body 101 of the tray 100 is withdrawn from the insertion space 63, force applied to the pushed portion 713 by the tray 100 disappears and the pushed portion 713 returns to a normal position (as shown in FIG. 12) under an elastic restoring force provided by the resilient arm 712; and the contact portion 714 is also moved together with the resilient arm 712 and returns to a normal position, so as to be in contact with the detect piece 72 to form electrical connection, therefore it can be known that the conductive pads 911 of the mini-SIM card 91 are not in contact with the first contact portions 33 of the first terminals 3 and the conductive pads 921 of the micro-SIM card 92 are not in contact with the second contact portions 53 of the second terminals 5, so that signal transmission is interrupted. Therefore, signal transmission of the first terminals 3 and the second terminals 5 can be controlled by the detect switch. In the present embodiment, the detect piece 72 is positioned inside the contact portion 714, so that both of them form electrical connection when the main body 101 of the tray 100 is withdrawn from the insertion space 63; when the main body 101 of the tray 100 is placed into the insertion space 63, both of them form a disconnected circuit, so that the state of the electrical connection is changed. However, in another embodiment, the detect piece 72 may be also positioned outside the contact portion 714, so that both of them are separated to form an disconnected circuit when the main body 101 of the tray 100 is withdrawn from the insertion space 63; when the main body 101 of the tray 100 is placed into the insertion space 63, both of them contact and form electrical connection. In this way, the state of the electrical connection may be also changed when the main body 101 of the tray 100 is placed into or withdrawn from the insertion space 63, so as to achieve detecting function.

Figure 15:
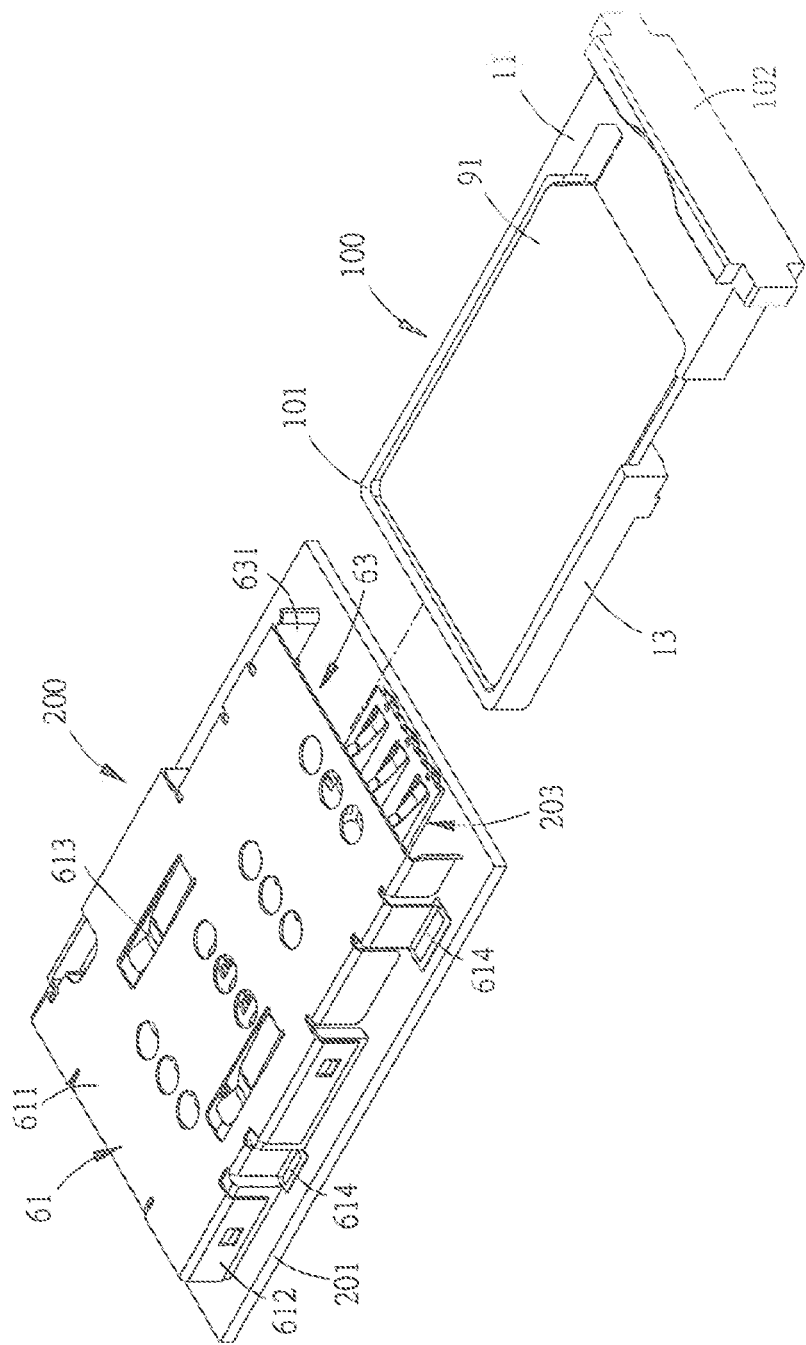
FIG. 15 is a perspective view illustrating a second preferred embodiment of an electrical connector device of the present application.

Referring to FIG. 15, the second embodiment of the electrical connector device is substantially similar to the first preferred embodiment and also includes a tray 100 and a connector module 200; however, the detailed construction of the tray 100 and the connector module 200 in the second preferred embodiment are somewhat different from that in the first embodiment. For the sake of brevity only differences between them will be described in the following description.

Figure 16:
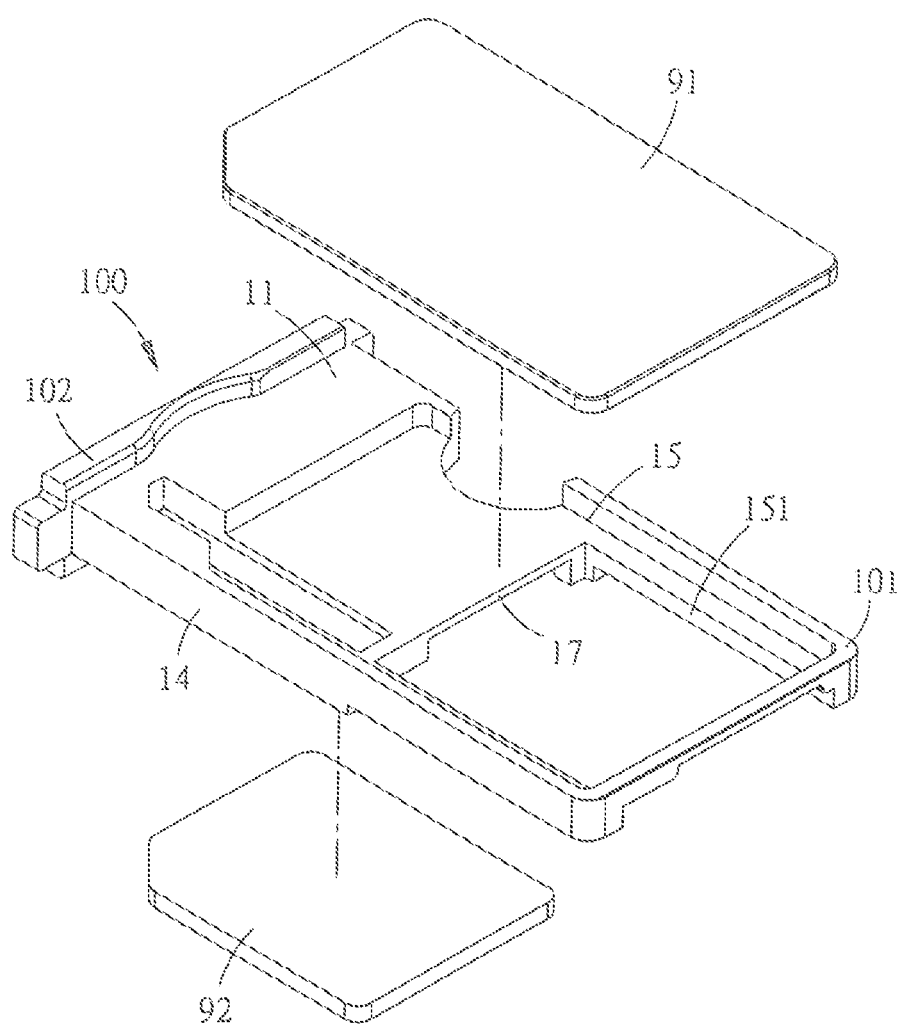
FIG. 16 is a perspective view illustrating an engagement relationship among a tray, a mini-SIM card and a micro-SIM card in the second preferred embodiment.
Figure 17:
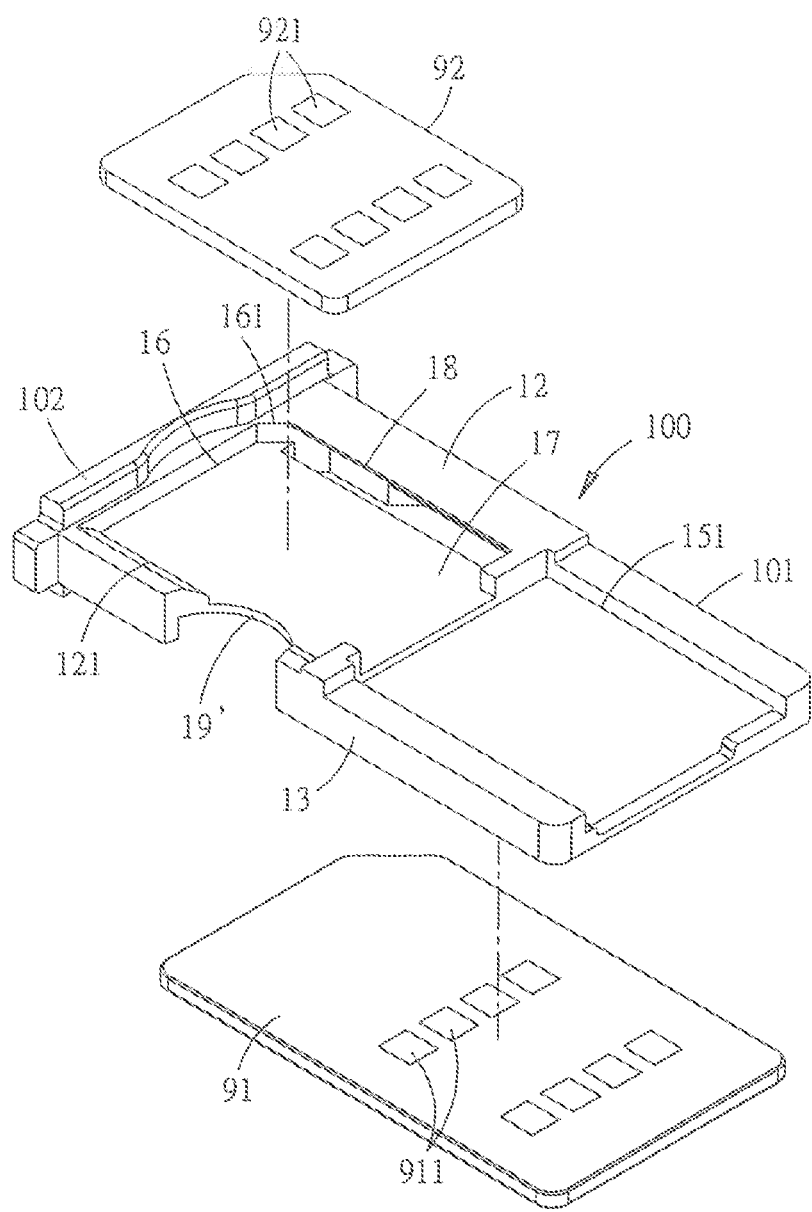
FIGS. 17-19 are perspective views illustrating an engagement relationship among the tray, a mini-SIM card and a micro-SIM card at the other side of the tray in the second preferred embodiment.
Figure 18:
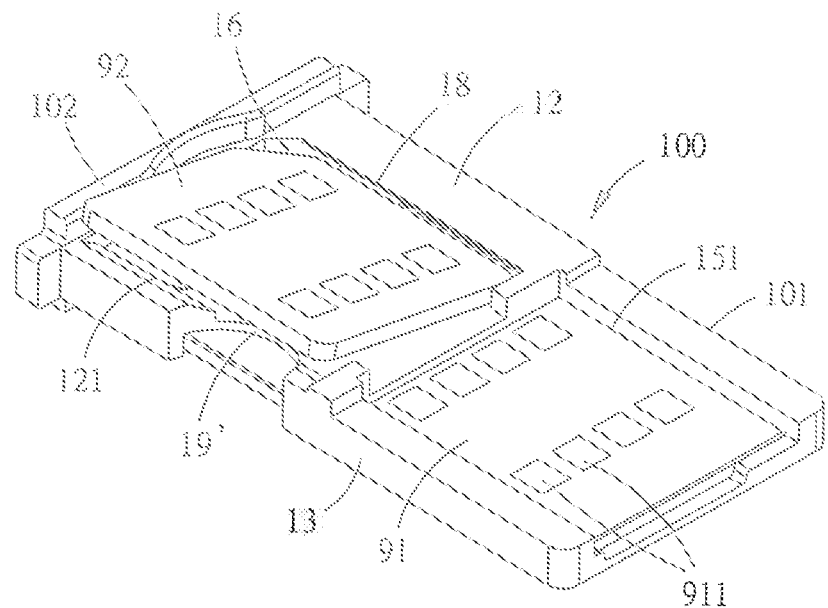
Figure 19:
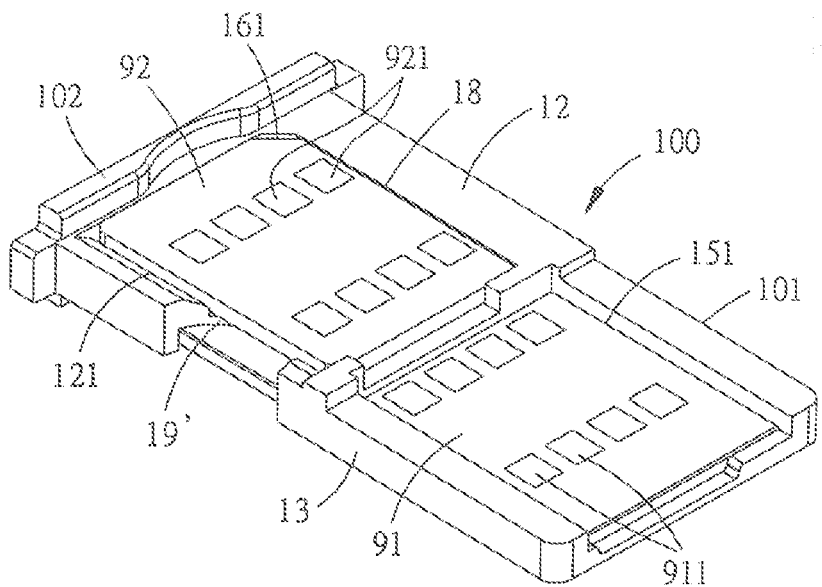
Figure 20:
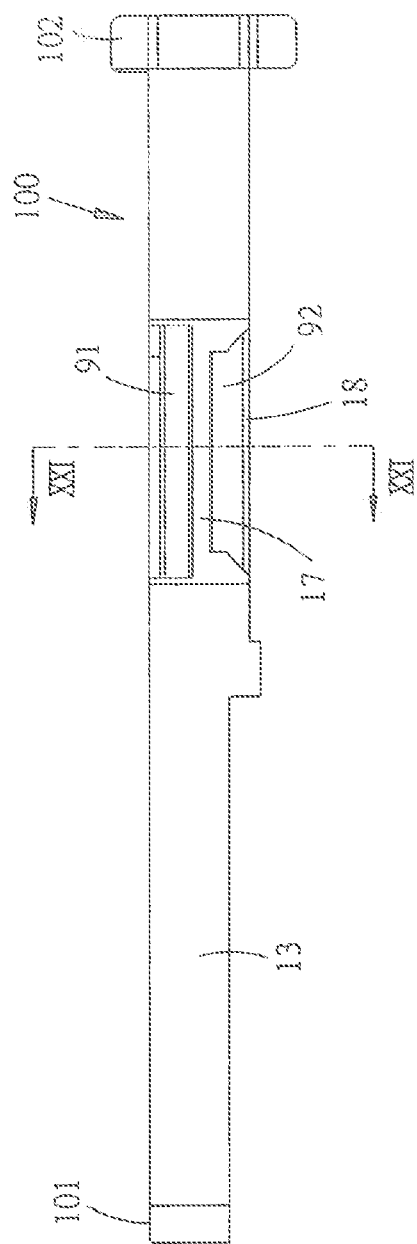
FIG. 20 is a side view of the tray loading SIM cards in the second preferred embodiment.
Figure 21:
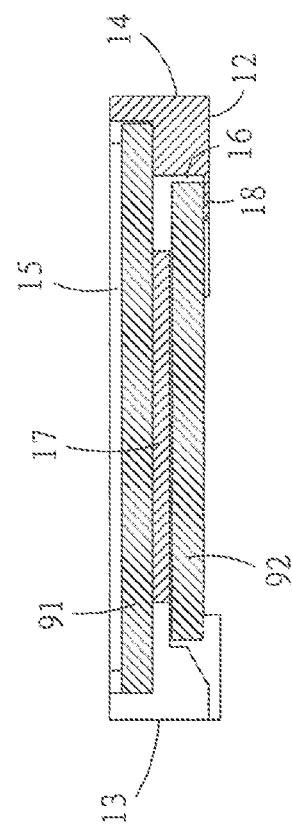
FIG. 21 is a sectional view taken along a XXI-XXI line of FIG. 20.

In the second embodiment, referring to FIG. 16, the tray 100 does not have a polarizing portion 103 (referring to FIG. 2); referring to FIG. 17, FIG. 18 and FIG. 19, a plane where the supporting plate 18 is present is opposite to and apart from a plane where the spacer 17 is present, and an edge of the supporting plate 18 defines one side of the second window 161. Furthermore, a notch 19' is formed by recessing inwardly from the first side surface 13 of the main body 101 toward the supporting plate 18 at an opposing side of the supporting plate 18 so as to provide a space for a finger to insert, therefore it is convenient to take out or put in the micro-SIM card 92; and a guide slope surface 121 is formed adjacent to the second window 161, as shown in FIG. 18, the micro-SIM card 92 may be obliquely placed into the second receiving groove 16 from the second window 161, so that one side of the micro-SIM card 92 firstly enters into a region between the spacer 17 and the supporting plate 18, the other opposing side may slide into the second receiving groove 16 along the guide slope surface 121, the micro-SIM card 92 may be taken out by a reverse operation. Referring to FIG. 20 and FIG. 21, displacement of the micro-SIM card 92 toward the bottom side 12 is limited by the supporting plate 18.

Figure 22:
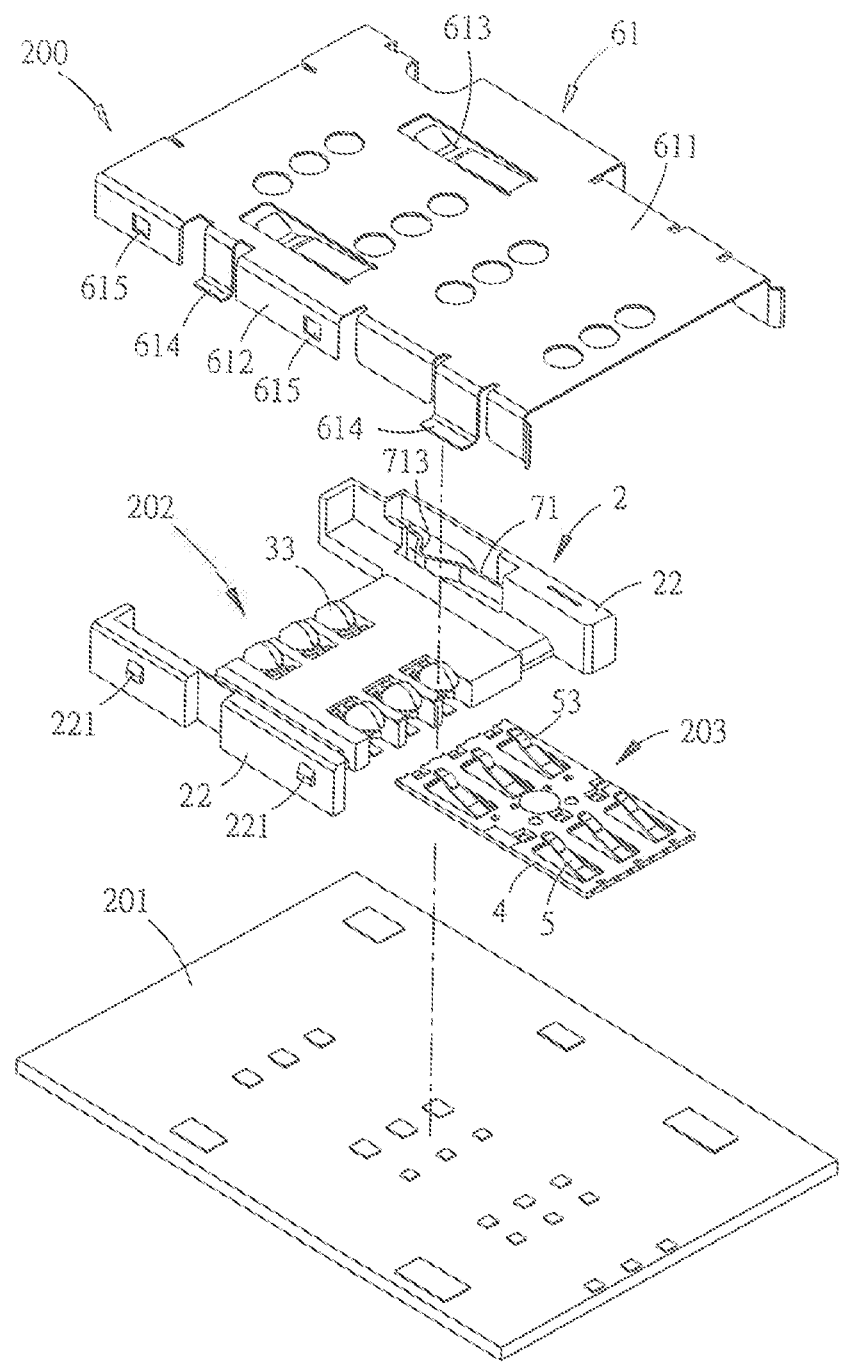
FIG. 22 is an exploded perspective view of a connector module of the second preferred embodiment.

Referring to FIG. 22, in the connector module 200 of the second embodiment, the outer shell only is a metal cover 61, and the first insulative body 2 further has two opposing side walls 22 and a plurality of projections 221 formed at outer surfaces of the two side walls 22. The metal cover 61 further has a plurality of through-holes 615 respectively formed to the two side plates 612, the through-holes 615 have a shape mating with the projections 221 to make the projections 221 inserted and latched, so that the metal cover 61 and the first insulative body 2 are connected and fixed; and the metal cover 61 is soldered to the circuit board 201 by the soldering legs 614. Moreover, in the second preferred embodiment, the detect terminal 71 is fixed in one of the side walls 22 of the first insulative body 2, but operation and function of the detect terminal 71 are the same as those of the first embodiment.

As can be appreciated, the tray 100 has the first receiving groove 15 and the second receiving groove 16 to respectively receive the mini-SIM card 91 and the micro-SIM card 92, so that the tray 100 may be loaded with two SIM cards with different sizes at the same time. Furthermore, the connector module 200 may receive the tray 100 and comprises the first connector 202 and the second connector 203 which are separately provided on the circuit board 201, so as to lower the volume of space after assembly and be capable of more easily controlling coplanarity of surface soldering and reducing manufacturing difficulty.

The disclosure provided herein describes features in terms of preferred and exemplary embodiments thereof Numerous other embodiments, modifications and variations within the scope and spirit of the appended claims will occur to persons of ordinary skill in the art from a review of this disclosure.

What is claimed is:

1. A dual SIM card tray for loading a mini-SIM card and a micro-SIM card, the tray comprising a main body, and the main body having:
    a top side;
    a bottom side positioned at an opposing side of the top side;
    a first receiving groove formed to the top side of the main body for loading the mini-SIM card;
    a second receiving groove formed to the bottom side of the main body and partially positioned below the first receiving groove for loading the micro-SIM card;
    a first window extending from a part of the first receiving groove in a direction from the top side to the bottom side and penetrating through the bottom side so as to expose conductive pads of the mini-SIM card toward the bottom side; and
    a second window being an opening of the second receiving groove on the bottom side, and the second window and the first window arranged in a lengthwise direction of the tray, so as to expose conductive pads of the micro-SIM card toward the bottom side, wherein the main body further has a spacer positioned between the first receiving groove and the second receiving groove and wherein the main body further has a supporting plate being a part constituting the second receiving groove; a plane where the supporting plate is present is opposite to and spaced apart from a plane where the spacer is present; and an edge of the supporting plate defines one side of the second window, and the supporting plate is used to limit displacement of the micro-SIM card toward the bottom side.

2. The dual SIM card tray according to claim 1, wherein the first receiving groove is formed by recessing from the top side toward the bottom side, and an entrance of the first receiving groove is at the top side to place the mini-SIM card into the first receiving groove.

3. A dual SIM card tray for loading a mini-SIM card and a micro-SIM card, the tray comprising a main body, and the main body having:
a top side;
a bottom side positioned at an opposing side of the top side;
a first receiving groove formed to the top side of the main body for loading the mini-SIM card;
a second receiving groove formed to the bottom side of the main body and partially positioned below the first receiving groove for loading the micro-SIM card;
a first window extending from a part of the first receiving groove in a direction from the top side to the bottom side and penetrating through the bottom side so as to expose conductive pads of the mini-SIM card toward the bottom side; and
a second window being an opening of the second receiving groove on the bottom side, and the second window and the first window arranged in a lengthwise direction of the tray, so as to expose conductive pads of the micro-SIM card toward the bottom side, wherein the main body further has a spacer positioned between the first receiving groove and the second receiving groove and, wherein the main body further has a side surface, an insert opening and a supporting plate; the side surface connects the top side and the bottom side and is parallel to the lengthwise direction of the tray; and the second receiving groove penetrates through the side surface so as to form the insert opening for placing the micro-SIM card at the side surface; the supporting plate is a part constituting the second receiving groove, is positioned at an opposing side of the insert opening and is opposite to and spaced apart from a plane where the spacer is present; and an edge of the supporting plate defines a part of the second window, and the supporting plate is used to limit displacement of the micro-SIM card toward the bottom side.

4. The dual SIM card tray according to claim 3, wherein the main body further has a recess portion positioned at an opposing side of the insert opening and extending from the second receiving groove in a direction away from the insert opening and exposed to the bottom side.

5. An electrical connector device, comprising a tray and a connector module;
the tray comprising a main body, the main body having:
a top side;
a bottom side positioned at an opposing side of the top side;
a first receiving groove formed to the top side of the main body;
a second receiving groove formed to the bottom side of the main body and partially positioned below the first receiving groove;
a first window extending from a part of the first receiving groove in a direction from the top side to the bottom side and penetrating through the bottom side; and
a second window being an opening of the second receiving groove on the bottom side, and the second window and the first window arranged in a lengthwise direction of the tray;
the connector module comprising:
a circuit board;
a first connector provided to the circuit board and comprising a first insulative body and a plurality of first terminals provided to the first insulative body, each first terminal having a first contact portion;
a second connector provided to the circuit board and separated from the first connector and comprising a second insulative body and a plurality of second terminals provided to the second insulative body, each second terminal having a second contact portion; and
an outer shell provided to the circuit board and covering the first connector and the second connector and defining an insertion space receiving the tray and an entrance for the tray entering into or coming out from the insertion space;
the first connector being away from the entrance relative to the second connector, and a height of the first contact portions of the plurality of first terminals on the circuit board being higher than a height of the second contact portions of the plurality of second terminals, the first contact portions of the plurality of first terminals corresponding to the first window, and the second contact portions of the plurality of second terminals corresponding to the second window.

6. The electrical connector device according to claim 5, wherein the main body of the tray further has a spacer positioned between the first receiving groove and the second receiving groove.

7. The electrical connector device according to claim 6, wherein the first receiving groove is formed by recessing from the top side toward the bottom side, and an entrance of the first receiving groove is at the top side to place the mini-SIM card into the first receiving groove.

8. The electrical connector device according to claim 6, wherein the main body of the tray further has a supporting plate being a part constituting the second receiving groove; a plane where the supporting plate is present is opposite to and spaced apart from a plane where the spacer is present; and an edge of the supporting plate defines one side of the second window.

9. The electrical connector device according to claim 6, wherein the main body further has a side surface, an insert opening and a supporting plate; the side surface connects the top side and the bottom side and is parallel to the lengthwise direction of the tray; and the second receiving groove penetrates through the side surface so as to form the insert opening at the side surface; the supporting plate is a part constituting the second receiving groove, is positioned at an opposing side of the insert opening and is opposite to and spaced apart from a plane where the spacer is present; and an edge of the supporting plate defines a part of the second window.

10. The electrical connector device according to claim 9, wherein the main body of the tray further has a recess portion positioned at an opposing side of the insert opening and extending from the second receiving groove in a direction away from the insert opening and exposed to the bottom side.

11. The electrical connector device according to claim 5, wherein the outer shell is a metal cover connected with the first insulative body and soldered to the circuit board.

12. The electrical connector device according to claim 5, wherein the outer shell comprises a metal cover and an insulative frame body which are connected with each other; and the metal cover is soldered to the circuit board.

13. The electrical connector device according to claim 12, wherein the connector module further comprises a detect switch which comprises a detect terminal and a detect piece; the detect terminal has a resilient arm, a pushed portion formed to the resilient arm, a contact portion formed to the resilient arm, and a connecting portion; the detect piece is formed to the metal cover and corresponds to the contact portion of the detect terminal, the metal cover and the connecting portion of the detect terminal are electrically connected with a detect circuit of the circuit board; the pushed portion of the detect terminal extends into the insertion space without external force and is withdrawn from the insertion space when being pushed; the contact portion is moved together with the pushed portion, and a state of electrical connection between the contact portion and the detect piece is changed when the pushed portion is withdrawn from the insertion space, thereby controlling signal transmission of the plurality of first terminals and the plurality of second terminals.

14. The electrical connector device according to claim 5, wherein the connector module further comprises a detect switch for controlling signal transmission of the plurality of first terminals and the plurality of second terminals.

* * * * *